N. WATERMAN.

Baking Pan.

No. 2,450. Reissued Jan. 8, 1867.

Witnesses
Lawrence Lyons
Arthur Neile

Inventor
Nath. Waterman

N. PETERS, Photo-Lithographer, Washington, D. C.

United States Patent Office.

THE RUSSELL AND ERWIN MANUFACTURING COMPANY, OF NEW BRITAIN, CONNECTICUT, ASSIGNEES OF NATHANIEL WATERMAN.

*Letters Patent No.* 23,517, *dated April* 5, 1859; *reissue No.* 2,289, *dated June* 19, 1866; *reissue No.* 2,450, *dated January* 8, 1867.

EGG PAN AND CAKE BAKER.

The Schedule referred to in these Letters Patent and making part of the same.

TO ALL WHOM IT MAY CONCERN:

Be it known that NATHANIEL WATERMAN, of Boston, in the county of Suffolk, and State of Massachusetts, has invented a new and improved Baking Pan; and it is hereby declared that the following specification, taken in connection with the drawings, making a part of the same, is a full, clear, and exact description thereof.

Figure 1:
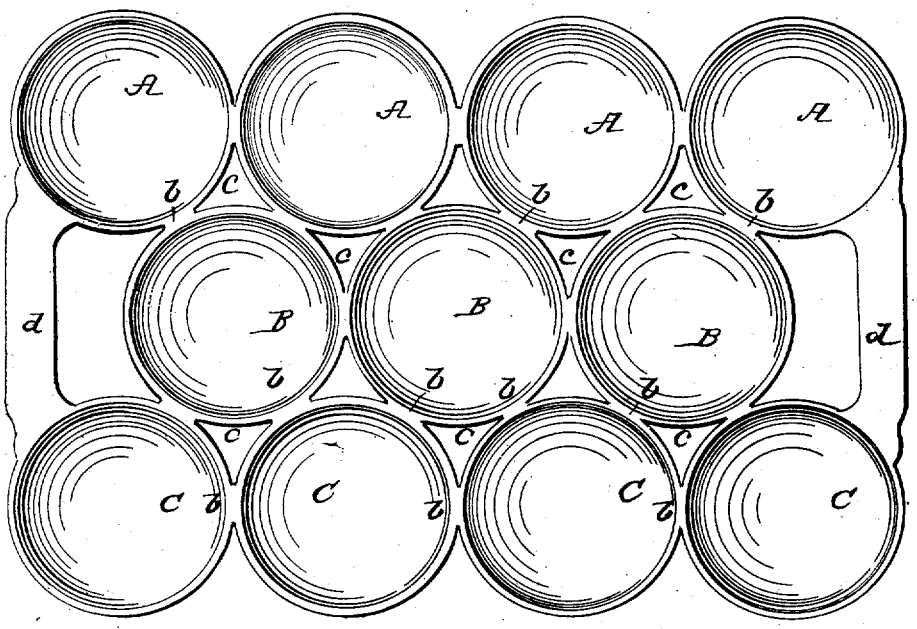

Figure 1 denotes a top view; and

Figure 2:
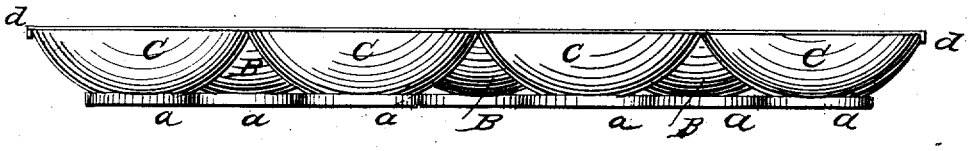

Figure 2, a side elevation of the same.

The invention herein described consists in a pan, which has the peculiarity of being composed of a number of distinct cups or small baking pans, connected together, but so arranged that there shall be secured, by means of open spaces between the several cups, or between the several series of cups, as, according to the arrangement of the pan may be most convenient, a uniformity in the circulation of the heated air about the cups of which the pan is composed. A baking pan composed of a series of distinct cups has heretofore been known; but until the improvements herein described it was not in general use, for the reason that the distribution of heat throughout its cups was not uniform, its use showing that when the bread contained in the outermost cups was thoroughly baked, that contained in the inner cups would be underdone.

Each of the cups is, in this instance, in the form of a flattened segment of a hollow sphere, and has, consequently, a flat and circular bottom, *a*, which, while serving as a support for the cup, affords, from its shape, a large extent of heating surface. In the series here presented the four cups of each outer row are disposed respectively opposite to the four cups of the other outer row, the middle row of cups being arranged between the two outer rows, so that each cup of the middle row shall be in contact with or at a like distance from the four cups of the two outer rows, as will appear in the drawings. Where the rim of each cup is nearest to that of the next adjacent one it is joined to the same by a short connection, *b*, the remainder of the space being left open, so as to form the air passages *c*. It is desirable also as a means of convenience, though not essential as a part of the invention, to connect the ends of the outer rows of cups by means of a bar, *d*, which will serve for a handle and also to strengthen the utensil. It is quite apparent that with a pan so provided with open-air spaces each cup or compartment of the series is as favorably situated as any other one for the action of the currents of heated air, and that the baking process will be conducted under the same conditions, whatever may be the size of the pan and the number of cups, whereas, were it not for such air spaces, the cups of the inner series, being less exposed to the action of the heat, would bake their contents more slowly than the cups of the outer rows. It is to be understood that the invention does not reside in the number, form, or arrangement of the several distinct cups or compartments which make up the baking pan, as the number, form, or arrangement of the same can be greatly varied to suit the preference of the constructor; but it is intended to comprehend any baking pan which is made up of distinct baking compartments, cast together so as to form one utensil; provided that each pan possesses the characteristic of being made with air spaces between the baking compartments, to effect the uniform distribution of currents of heated air among such compartments. It is desirable to have as many heat passages as possible, and the arrangement of the cups shown in the drawings is, for this purpose, perhaps as economical as any other; but the number of such heat passages is not essential, so long as they are sufficient in number to accomplish the result desired.

What is claimed as the invention of the said NATHANIEL WATERMAN, and is desired to be secured by Letters Patent, as a new article of manufacture, is—

A baking pan, composed of a series of distinct cups or baking compartments, all connected together, cast in one piece, and forming one utensil, but perforated with intermediate open spaces *c*, for the distribution of currents of heated air among the several compartments, the whole article being substantially such as specified.

In witness whereof the Russell and Erwin Manufacturing Company have, as the assignees of the entire right, hereunto subscribed the name of said company, by L. Woodruff, their secretary, for that purpose duly authorized.

RUSSELL AND ERWIN MANUFACTURING COMPANY.
L. WOODRUFF, *Secretary.*

Witnesses:

H. E. RUSSELL, 2d,
M. S. WIARD.